United States Patent [19]

Siegal

[11] 4,132,976
[45] Jan. 2, 1979

[54] OPERATOR READABLE AND MACHINE READABLE CHARACTER RECOGNITION SYSTEMS

[76] Inventor: Richard G. Siegal, 6201 N. Kenmore, Apt. 202, Chicago, Ill. 60660

[21] Appl. No.: 610,928

[22] Filed: Sep. 8, 1975

[51] Int. Cl.$^2$ ............................................. G06K 9/18
[52] U.S. Cl. .................... 340/146.3 Z; 179/84 VF; 179/90 K; 235/495; 340/365 R
[58] Field of Search ............... 340/146.3 R, 146.3 Z, 340/146.3 SY, 146.3 AQ, 146.3 A, 407, 365 R, 365 S; 179/90 K; 197/100; 178/18, 30; 235/61.12 N, 61.6 E

[56] References Cited

U.S. PATENT DOCUMENTS

| | | | |
|---|---|---|---|
| 3,058,093 | 10/1962 | Vernon et al. | 340/146.3 Z |
| 3,351,906 | 11/1967 | Van Duuren | 340/146.3 Z |
| 3,381,276 | 4/1968 | James | 179/90 K |
| 3,410,991 | 11/1968 | Van Berkel | 340/146.3 Z |
| 3,485,168 | 12/1969 | Martinson | 235/61.12 N |
| 3,527,927 | 9/1970 | Bijleveld et al. | 235/61.12 N |
| 3,559,170 | 1/1971 | Barnes | 340/146.3 Z |
| 3,576,430 | 4/1971 | Fickenscher | 235/61.12 N |
| 3,675,513 | 7/1972 | Flanagan et al. | 179/84 VF |
| 3,699,518 | 10/1972 | Greenough et al. | 340/146.3 Z |
| 3,704,343 | 11/1972 | Howard | 178/30 |
| 3,760,121 | 9/1973 | Nissim | 179/90 K |
| 3,776,454 | 12/1973 | Jones | 340/146.3 Z |
| 3,778,553 | 12/1973 | Rackman | 179/90 K |
| 3,833,882 | 9/1974 | Busby | 340/146.3 Z |
| 3,869,600 | 3/1975 | Hochstadt | 235/61.12 N |
| 3,872,463 | 3/1975 | LaPeyre | 178/30 |
| 3,886,326 | 5/1975 | Horvath et al. | 235/61.12 N |
| 3,967,273 | 6/1976 | Knowlton | 340/365 R |

OTHER PUBLICATIONS

Peterson et al., "Fonts and Constraints for Alpha Numeric Hand Printing", IBM Tech. Disclosure Bulletin, vol. 14, No. 8, Jan. 1972, pp. 2274-2275.
Clapper, "Write-In Matrix Circuit", IBM Tech. Disclosure Bulletin, vol. 6, No. 2, Jul. 1963, pp. 53-54.

*Primary Examiner*—Leo H. Boudreau
*Attorney, Agent, or Firm*—Hill, Gross, Simpson, Van Santen, Steadman, Chiara & Simpson

[57] ABSTRACT

A character recognition system incorporating a three-by-three matrix has a family of operator readable and machine readable alphanumeric characters formed in relation to a three-by-three matrix for designating a plurality of individual parameters in response to whether discrete locations within the three-by-three matrix are occupied or not occupied by a portion of the character. The characters are made available in machine readable form by being inscribed on a form which is printed with a plurality of circles which designate the discrete locations and which are arranged in each of a number of rectangular three-by-three arrays, to indicate graphically the positions which are scanned during reading of the form. Machine readable characters are inscribed in the rectangles through and around the circles, in accordance with a characteristic coding scheme, which incorporates up to 512 different individual characters. Locations on the form other than the discrete locations are ignored during machine reading, but are used to render otherwise esoteric characters operator readable.

12 Claims, 4 Drawing Figures

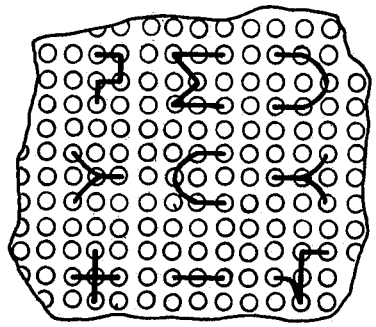
Fig. 3
Fig. 4
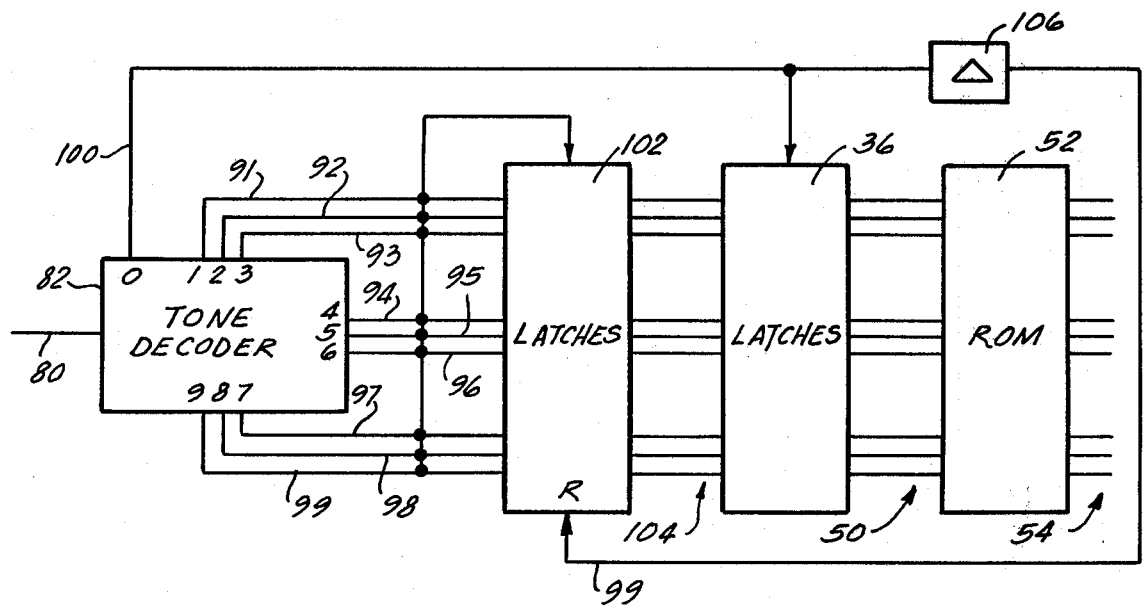

OPERATOR READABLE AND MACHINE READABLE CHARACTER RECOGNITION SYSTEMS

BACKGROUND

1. Field of the Invention

The present invention relates to a character recognition system, and more particularly to a system in which a family of alphanumeric characters is adapted for machine reading. 2. The Prior Art As data processing equipment becomes more common, and as the range of applications of such equipment increases, the problem of data entry assumes a more important aspect. In the past, it has been conventional to enter data by means of a key punch machine, by which punched cards are produced through the efforts of a key punch operator. More recently, key to tape and key to disc systems have become available, but they also require the use of a human operator whose function is solely to convert data from human readable form to machine readable form. This technique of data entry, requiring the use of a translator, is an obstacle to achieving efficient data entry, and also represents a source of errors and inaccuracies.

Some machines have been devised to optically read certain kinds of print or typing, but these machines are not able to read characters written by hand, because of the lack of uniformity and size of such characters.

A great variety of machine readable families of characters have been devised in the past. These characters, with few exceptions, have generally not been equally well adapted for recognition by a human operator and for machine reading. The more suitable a family of characters is for machine reading, the less feasible it is to provide for visual recognition of the characters. The exceptions consist of families having relatively few characters. Although the familiar magnetically coded set of characters includes alphabetic characters as well as numerals, the alphabetic characters are rarely used, both because of their lack of similarity to conventional printed characters, and because of the difficulties encountered in decoding such characters. Moreover, the magnetically coded set is not adapted for being written by hand without the use of machinery especially constructed for that purpose.

While it is possible to train an operator to recognize esoteric symbols and codes which are designed primarily to be machine readable, such arrangements are not suitable for use by relatively unskilled persons, but are effectively restricted to highly skilled personnel or else require complicated coding machines. There is, therefore, a need for a family of characters which can be produced by relatively unskilled personnel, which includes numerical and alpha characters and which is also machine readable, and which can be written by hand without the use of special machinery.

SUMMARY OF THE INVENTION

A principal object of the present invention is to provide a family of characters which may be readily written and read by a human operator as well as by a machine.

Another object of the present invention is to provide a family of characters for use with a character recognition system in which a relatively unskilled operator may readily and accurately enter input into a data processing system or the like, by means of producing written characters which are scanned in order to determine the presence or absence of portions of said characters coincident with discrete locations within a three-by-three array.

These and other objects and advantages of the present invention will become manifest upon an examination of the following description and the accompanying drawings.

In one embodiment of the present invention, there is provided a character recognition system comprising scanning means for optically scanning each of nine discrete positions within a three-by-three array, means responsive to said scanning means for determining the presence or absence of hand writing at each discrete position within said array, and output means for manifesting the character corresponding to the scanned array.

BRIEF DESCRIPTION OF THE DRAWINGS

Reference will now be made to the accompanying drawings, in which:

FIG. 3 is an illustration of a portion of a printed form showing additional characters; and FIG. 4 is a functional block diagram of apparatus used for detecting and manifesting characters transmitted over a telephone transmission line.

DESCRIPTION OF THE PREFERRED EMBODIMENT

Figure 1:
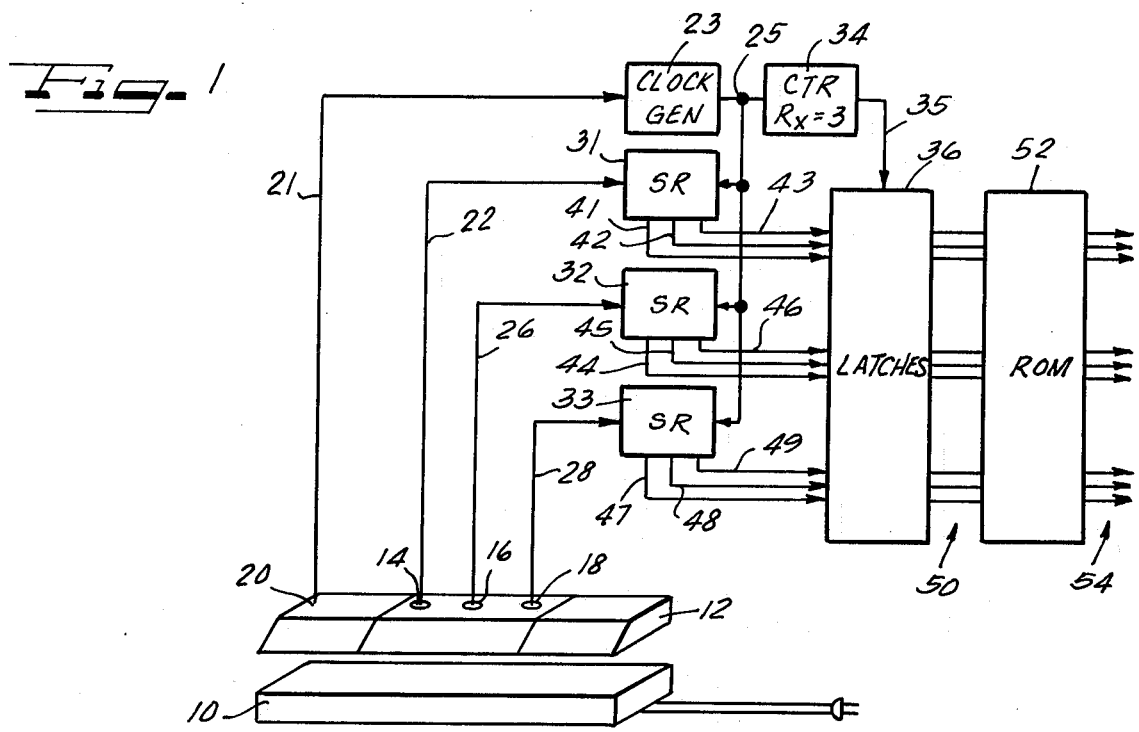
FIG. 1 is a block diagram of apparatus comprising an illustrative embodiment of the present invention.

Referring now to FIG. 1, there is illustrated a scanning arrangement whereby a series of characters formed in accordance with the present invention may be automatically read. The characters are handwritten on a translucent paper sheet, each in a three-by-three array. The sheet is passed through a slot between a source of light 10 and a bracket 12, which supports three photosensitive devices 14, 16 and 18 in fixed spatial relation therewith. The three photoelectric devices 14, 16 and 18 are adapted to simultaneously scan three rows of positions within the three-by-three array in which the character is contained. A fourth photoelectric device 20, also mounted on the bracket 12, is adapted to scan a timing track provided on the edge of the paper sheet, in order to synchronize operation of the three photoelectric devices 14, 16 and 18.

The photoelectric device 20 is connected by a line 21 to a clock generator 23, which provides timing or clock pulses on a line 25. The line 25 is connected to the clock inputs of three shift registers 31-33, the data inputs of which are connected to the three photoelectric devices 14, 16 and 18 by the lines 22, 26 and 28, respectively.

The timing track inspected by the photoelectric device 20 contains a mark aligned with each column of the three-by-three array, and so the pulses present on the line 25 coincide in time with the signals present on the lines 22, 26 and 28, as the individual discrete locations of the three-by-three arrays are scanned.

The shift registers 31-33 each have three stages, and function to step data received at their inputs from stage to stage, under the control of the clock pulses on the line 25. Each stage is connected to a separate output line 41-49. After three clock pulses, corresponding to the scanning of three columns of a single array, the three shift registers store, in binary form, digital representations of which of the discrete areas that were scanned contained a mark, and which did not. The three-by-three array has accordingly been converted into digital form. The clock line 25 is connected to the input of a counter 34, which has a radix of three, so that an overflow pulse is produced for every three pulses received from the line 25. The overflow pulse appears on a line 35, which is connected to the set inputs of a group of latches 36. The data inputs of the latches 36 are connected individually to the nine output lines 41-49 of the shift registers 31-33, and function to store a binary representation of the state of each shift register stage at the time of the pulse on the line 35. As the pulse on the line 35 is timed to coincide with the time that the shift registers 31-33 store data derived from a single three-by-three array corresponding to a single character, the latches 36 store a character representation, coded in accordance with the way in which the scanned character is written on the paper sheet.

Each of the latches 36 produces a separate output on a line 50, and the nine lines 50 are connected to nine inputs of a read-only-memory or ROM 52. The ROM has nine outputs 54, which present the character-representative data supplied by the signals on the lines 50, but in a modified form, in accordance with the coding of the ROM. The ROM is preferably coded to produce, on six of its outputs, signals corresponding to the conventional ASTI binary code for alphanumeric characters, when the remaining three lines present a certain pattern of signals, such as 000 or 111. Other patterns of signals on the remaining three lines signify that the characters being represented are not the ones to which the conventional binary codes apply. The use of standard character codes for alphanumeric characters facilitates interconnection of the apparatus of FIG. 1 with data processing apparatus which are designed to receive and process data in standard six bit formats. The full advantages of the character designating capacity of the present invention are not realized, however, unless the data processing system is adapted to store and process nine bit characters. This facility can easily be achieved in most data processing apparatus, for example by providing a program which allows data characters to be stored in two words of storage rather than one.

Figure 2:
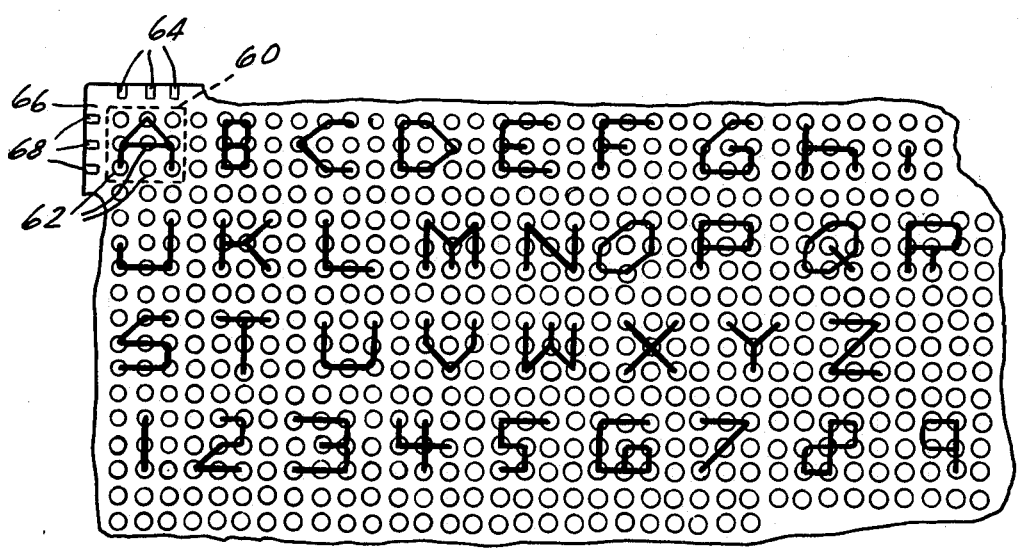
FIG. 2 is a diagrammatic illustration of a printed form used in connection with the present invention, showing a plurality of characters making up a portion of a family of alphanumeric characters.

Referring now to FIG. 2, a portion of a paper sheet or form in which representative characters have been placed is illustrated. One character illustrated in FIG. 2 is the letter "A", which is located within a box 60, defined by a three-by-three array of circles 62, each defining a discrete location. The letter "A" is formed by a number of lines which pass through six of the circles, and specifically, through the middle circle in the top row, all three circles in the middle row, and the first and third circles of the bottom row. A timing track composed of marks 64 has the marks 64 aligned with the columns of dots within the box 60. The timing track is located along the lower edge of the paper sheet 66 on which the box 60 appears. An auxiliary timing track, composed of marks 68 aligned with the rows of the box 60, may be employed when the character within the box 60 is oriented at right angles to the manner illustrated in FIG. 2. In this way, the paper sheet 66, on which the box 60 appears, may be scanned in either of two orthogonal directions. This means that when the characters are placed on the paper sheet 33, the sheet may be oriented in either of two orthogonal directions, as desired, but preferably all the characters are placed on the sheet in the same orientation.

No specific means for scanning separate rows of characters has been illustrated in FIG. 1, for systems for providing this kind of a movement are well known in the art. The details of the apparatus for indexing the paper, or the scanner, line by line, to enable successive scanning of the several lines of characters on the sheet 66, does not, per se, form a part of the present invention.

In FIG. 2, representative characters are shown for all of the letters of the alphabet and for all of the decimal numerals from 1 through 0. In addition, several representative additional characters are illustrated in FIG. 3, which preferably have meanings assigned thereto consistent with their appearance. Using the three-by-three array, a total of 512 different and individual characters may be coded and recognized in carrying out the system of the present invention.

It will be apparent from FIG. 2 that the letter "A" is drawn in such a way as to cross through the areas defined by certain of the circles printed on the form and to avoid crossing through other circles. The scanning is such as to detect the presence of a handwritten pencil or ink line within any portion of a circle, so that the circles need not be entirely blocked out. That is, the scanning means is focused to inspect the entire area within a circle. It is sufficient simply to draw a pencil or ink line through the circles in a manner such as to form a conventional character in ordinary fashion. The circles which are not crossed by the lines of the character remain free of any lines, so as to present a blank appearance to the scanning system, whereupon the scanning system registers them as different from the circles which are crossed. The use of a three-by-three array, as illustrated in FIG. 2, makes it possible to devise a code which is easily remembered after only a brief instruction in the code and its use. In this way, relatively unsophisticated operators may use the code with ease. In addition, the code bears a striking resemblance to the ordinary appearance of alphanumeric characters, so that the information is readily readable by an operator or reader in a visual manner, as well as by machine.

The use of the three-by-three array also provides additional advantages. The character code devised according to the present invention can readily be transmitted over a push button tone telephone system by actuating various ones of the ten buttons of the tone telephone, which identify the numerals 0 through 9. One system for decoding tone signals transmitted over a telephone line, in response to pushing the various buttons of a telephone instrument, is shown in FIG. 4. The nine push buttons normally used for the numerals 1-9 are depressed in accordance with the corresponding circles in a three-by-three array. For example, in the case of an "A", the middle push button (2) on the top row would be pushed, followed by the three push buttons (4-6) in the middle row, each being pushed individually, followed by the first and third push buttons (7 and 9) in the third row. The bottom button (0) is pushed after all of the character-forming push buttons have been operated. At the receiving end, shown in FIG. 4, the telephone line 80 is connected to the input of a conventional tone decoder 82, which has ten output lines 91-100, which are energized individually in response to receipt of a corresponding tone. The lines 91-99, representative of 1-9, are connected to the data inputs of a group of latches 102. The latches 102 are comprised of a group of set-reset or RS flip-flops, with the set input of each being connected to an individual output line of the tone decoder 82. The reset inputs of all of the flip-flops are connected in common to a reset line 99, which, when energized, resets all of the flip-flops simultaneously.

The various flip-flops making up the latches 102 store the character representing signals produced by the output lines 91–99 of the tone decoder 82 as they are received, and continue to store them until reset.

Each flip-flop of the latches 102 has an output individually connected to one of the output lines 104, and the lines 104 are connected to individual data inputs of the latches 36. The set inputs of the latches 36 are connected to the line 100, which is energized when a "0" tone is detected. Accordingly, the latches 36 become set with the data stored in the latches 102 at the time of a "0" tone. The outputs 50 are decoded by the ROM 52 to produce signals on the lines 54, just as described in connection with FIG. 1.

The line 100 is connected to the reset line 99 through a delay unit 106, which performs the function of delaying the pulse resetting the latches 102 until the latches 36 have been set. Resetting the latches 102 readies them for receipt of a subsequent character.

The three-by-three array of the present invention achieves the advantage of permitting transmission with ordinary push button tone telephone instruments, which are unmodified with the provision of extra keys not found on all such instruments.

The character recognition system incorporating the present invention makes it possible to simplify a variety of data entry procedures. Simplification is achieved in using the present invention through the elimination of multiple steps currently needed for data entry. For example, prior to the present invention, raw data was conventionally originated in a handwritten or typewritten form, and entry of such data required the activities of a key puncher or the like, who made a coded record of the data by use of a keyboard while visually reading the raw data. Later, a verifier would again visually read the raw data to verify that the key puncher entered the data correctly. And, in some cases, checking calculations for batches of the data had to be made on an adding machine or the like, to double check the verifier. All these former procedures are telescoped into a single operation by the originator of the data, who originates the raw data in machine readable form using the present invention.

When used in connection with a form which is filled out by a job application, a census taker, a person writing up a purchase order, or the like, the three-by-three arrays in which characters are to be written may be placed anywhere on the form, with the position identified along the edges of the form by means of suitable timing tracks 64 and 68 (FIG. 2). The provision of the two separate timing tracks along two adjacent edges of the form aligned with the three-by-three arrays permits easy location of the precise positions of the arrays in which the characters are contained, so that only those locations are scanned; other information which may be present on the form and which is irrelevant to the desired data entry are ignored.

Although a scanning system employing transmitted light is illustrated specifically in FIG. 1, it will be obvious to those skilled in the art that a system employing reflected light is equally suitabel and may be substituted for the system employing transmitted light. Other modifications and changes will be apparent to those skilled in the art without departing from the essential features of novelty in this invention.

Instead of a push button tone telephone, a series of touch sensitive controls or switches may be used to effect data entry or to transmit character-representative signals over a transmission line. Each such switch has a conductive plate adapted to be touched by an operator's finger to trigger operation of the control or closing of the switch. The conductive plates for nine switches for arranged in a three-by-three array, so that characters may be entered or transmitted by the act of the operator's drawing of the outlines of such characters on the conductive plates. A tenth separate plate is touched to signal the end of a character. Alternatively, the opertor may use a conductive pointer connected in an electrical circuit with the plates to trigger the switches. When such other apparatus is used, the data is transmitted and/or decoded in the same manner as described above.

What is claimed is:

1. A method of entering data into a data processing system, comprising the steps of:
providing a sheet having an area designated with a plurality of spaced apart, open circles arranged in three rows and three columns,
placing a handwritten mark in the form of a character on said sheet passing through any part of at least one of said circles to mark said circle,
providing a data processing system having a scanning device for scanning said sheet and for producing signals representative of circles which have a mark placed therein and for producing no signals in response to handwritten marks on said sheet not within a circle,
whereby said signals define a binary representation of said character, 2. The method of according to claim 1, including the steps of storing a binary representation of the marked circles, and manifesting a coded representation of said character.

3. The method according to claim 1, including the steps of providing a sheet with a multiplicity of areas each designated with a three by-three matrix of circles, and placing handwritten marks in a plurality of said areas designating alphanumeric characters.

4. A method of entering a character into a data processing system comprising the steps of:
providing a push button telephone having at least nine push buttons arranged in three rows and three columns,
operating two or more of said nine push buttons successively within a predetermined interval,
providing data processing apparatus having decoding apparatus for receiving and decoding signals produced by said push button telephone and for manifesting signals representative of an alphanumeric character, said operated ones of said push buttons bearing a physical relationship to each other within said three rows and three columns which corresponds to the apparent shape of said character,
and operating an additional push button to signify the end of a said predetermined interval.

5. For use in a character recognition system, apparatus for reading a character comprising:
scanning means for scanning a plurality of spaced apart, localized open areas of a surface bearing handwritten marks,
storage means for storing representations of the presence of a mark or no mark within nine of said localized open areas arranged in three rows and three columns, and for not storing the presence of marks outside said localized areas, and manifesting means for manifesting a coded binary representation of a character corresponding to the combination of marks and no marks at the nine areas.

6. Apparatus according to claim 5, wherein said surface comprises a translucent sheet.

7. Apparatus according to claim 6, wherein said sheet is marked with a plurality of circles, one for each of said areas.

8. Apparatus according to claim 7, wherein said circles are printed on said sheet defining areas of said sheet surrounding said circles, whereby a mark within one of said areas is detected by said scanning means and a mark without the areas is not.

9. Apparatus according to claim 7, wherein said circles are printed with a visible material to designate the locations of said areas, and including synchronizing marks printed on said sheet, said scanning means detecting said marks for operating said storage means when the area within said circles is being scanned.

10. Apparatus according to claim 5, wherein said scanning means is insensitive to marks on said surface except in areas closely adjacent said circles.

11. Apparatus for manifesting characters transmitted by a push button telephone comprising:

decoding means connected to a transmission line leading from a transmitting telephone for receiving and decoding tone signals transmitted from said telephone over said transmission line, storage means connected to said decoding means for storing representations of signals associated with specific push buttons of said push button telephone, and manifesting means for manifesting a coded binary representation of an alphanumeric character corresponding to the combination of signals transmitted over said transmission line during a previous predetermined interval, said combination including at least two successive signals corresponding to operation of two or more different ones of nine of said push buttons arranged in three rows and three columns, said operated ones of said push buttons bearing a physical relationship to each other which corresponds to the apparent shape of said alphanumeric character.

12. Apparatus according to claim 11, including means responsive to the receipt of a tone designating depression of a specific push button of said push button tone telephone, said manifesting means being responsive to said last named means for terminating one predetermined interval and initiating a subsequent one.

* * * * *